United States Patent [19]

Smith

[11] Patent Number: 5,496,911
[45] Date of Patent: Mar. 5, 1996

[54] PROCESS FOR THE PRODUCTION OF POLYUREA BASED ARTICLES

[75] Inventor: Stuart B. Smith, Conyers, Ga.

[73] Assignee: ECP Enichem Polimeri Netherlands, B.V., Amsterdam, Netherlands

[21] Appl. No.: 400,193

[22] Filed: Mar. 3, 1995

Related U.S. Application Data

[63] Continuation of Ser. No. 160,781, Dec. 3, 1993, abandoned, which is a continuation-in-part of Ser. No. 130,762, Oct. 4, 1993, abandoned.

[51] Int. Cl.$^6$ .................................................. C08G 18/10
[52] U.S. Cl. ................ 528/77; 264/255; 264/328.2; 521/116; 521/125; 521/129; 521/167; 521/176
[58] Field of Search ......................... 264/250, 255, 264/240, 300, 328.2, 328.8; 521/129, 159, 161, 163, 167, 170, 116, 125, 176; 528/77

[56] References Cited

U.S. PATENT DOCUMENTS

| | | | |
|---|---|---|---|
| 4,209,593 | 6/1980 | Khanna | 521/163 |
| 4,581,388 | 4/1986 | Rasshofer et al. | 521/159 |
| 4,795,764 | 1/1989 | Alm et al. | 521/129 |
| 4,822,549 | 4/1989 | Verwilst et al. | 264/250 |
| 4,940,737 | 7/1991 | Braatz et al. | 521/159 |
| 5,059,634 | 10/1991 | Smith . | |

*Primary Examiner*—Mathieu D. Vargot
*Attorney, Agent, or Firm*—Oblon, Spivak, McClelland, Maier, & Neustadt

[57] ABSTRACT

This invention relates to a polyurea based RIM composition, a method of molding a polyurea based composition and molded articles of a polyurea based RIM composition. The polyurea based RIM composition includes A) an isocyanate quasi pre-polymer component comprising the reaction product of:
  i) a polyisocyanate having a free isocyanate content of from 20–33% by weight NCO;
  ii) a polyether triol component having from 50–85% by weight ethylene oxide units and 15–50% by weight propylene oxide units;
  wherein said isocyanate quasi pre-polymer has a final NCO content of from 10–27%; and B) a polyol component comprising:
  i) an amine terminated polyether polyol with functionality of 2 or 3 and having a number average molecular weight of 2,000–5,000;
  ii) an aromatic diamine; and
  iii) a hydroxy terminated and amine started polyether polyol of 200–800 number average molecular weight;

wherein said amine terminated polyether polyol (i) and said aromatic diamine (ii) are present in a ratio (i)/(ii) of at least 2:1 and said aromatic diamine (ii) and said hydroxy terminated and amine started polyether polyol (iii) are present in a ratio (ii)/(iii) of ≧2.5:1.

15 Claims, No Drawings

PROCESS FOR THE PRODUCTION OF POLYUREA BASED ARTICLES

This application is a Continuation of application Ser. No. 08/160,781, filed on Dec. 3, 1993, now abandoned, which is a CIP of 08/130,762, filed on Oct. 4, 1993, now abandoned.

BACKGROUND OF THE INVENTION

1. Field of the Invention

This invention relates to a process of molding a polyurea based composition, a polyurea based RIM composition, and molded articles obtained thereby by RIM and spray molding.

2. Discussion of the Background

Polyurethane polymers prepared from an active hydrogen-containing compound and an isocyanate are widely employed in molding processes, particularly reaction injection molding (hereinafter RIM) processes. RIM articles are finding increased usage as automotive fascia.

The basic polyurethane polymer systems are typically based on an OH polyol component, an OH cross-linker and an isocyanate component. However this system suffers from long cream, demolding and cycle times, greatly increasing the processing time. Modifications to the basic polyurethane system to shorten these processing times has been achieved through substitution of the OH cross-linker with an aminic cross-linking system. Typically, thermosetting urethane polymer compositions comprise an isocyanate component with an excess of isocyanate groups and an aromatic diamine as a chain extender, to form a polyurea-type urethane polymer. Optionally, the polymer composition may also contain additional amounts of a reactive polyol to form a hybrid urea-urethane polymer. Such systems greatly decrease the cream and demolding times, therefore enabling much shorter cycling times in a RIM process.

The use of chain extenders, such as di-alkyl aromatic diamines, and more particularly di-ethyltoluene diamines and di(alkylthio)aromatic diamines are often used with isocyanate pre-polymers alone or with a polyol component to form a polyurea/polyurethane molding RIM composition (for example U.S. Pat. No. 4,595,742, 4,631,298, and 4,786, 656). While an increase in the flexural modulus is observed through the addition of di-alkyl(thio)aromatic diamines, these compositions are still limited with respect to flexural modulus without observing "cold break" on demolding. "Cold Break" is a brittleness observed in the molded article during demolding. The presence of cold break causes the molded article to fracture on demolding. When trying to achieve a higher flexural modulus, to above 80,000 psi, by increasing the isocyanate content of the isocyanate component (i.e. higher % NCO), these materials suffer "cold break". Alternatively attempts to increase the flexural modulus by increasing the functionality of the polyol component also suffers from "cold break". Accordingly, efforts to increase the flexural modulus while preventing "cold break" is an on going area of research.

In addition to the mechanical properties of the polyurethane polymer, the processing of the polymer systems plays an important role in the usefulness of a polyurethane system. In RIM processing, a short gel time is desired to increase the productivity of the overall process. However, polyurethane systems based on an OH polyol component, an OH cross-linker and an isocyanate component had a gel time of from 5–8 seconds and a cycle time of from 3–3.5 min. Polyurethane systems using -NH$_2$ crosslinkers and -OH polyols (for example U.S. Pat. Nos. 4,595,742, 4,631,298, and 4,786, 656) reduced the gel time to about 1.2 seconds and the cycle time to 1.5–2 min. This greatly increased the productivity of RIM processes using these systems, but these -NH$_2$ crosslinkers and -OH polyols systems suffered from an inability to increase the flexural modulus above 80,000 psi without observing "cold break" without the addition of fillers.

Polyurea systems based on amine terminated polyether resins and aminic cross-linkers have been developed (U.S. Pat. No. 4,433,067 and 4,444,910), which afford superior heat resistance and mechanical properties, and due to the extremely high reactivity of the amine terminated polyether resin, the gel times are extremely short, in the range of 0.7 seconds. Such a rapid reaction rate makes these systems very difficult to manipulate, and also severely limits the type of RIM technique for which such a composition is suitable. For example, Structural Reaction Injection Molding (S-RIM) is not applicable to such a system due to the short reaction time, resulting in incomplete wetting of the structural reinforcement.

It has also been discovered that the flexural modulus of a polyurethane composition based on MDI-polyol prepolymer and an aromatic diamine can be increased beyond 80,000 psi at 75° F. while being substantially free of "cold break" by the addition of a "cold break" additive such as triethanol amine or a triethanol amine-ethylene oxide end capped reaction product (U.S. Pat. No. 5,059,634). However the mechanical properties and processability of the "cold break" containing polyurethane compositions can still be improved.

The polyether polyol component in a polyurethane system is typically based on ethylene oxide or propylene oxide or a mixture of the two. Block copolymers may be manufactured by first reacting propylene glycol with propylene oxide to form a homopolymer followed by reaction with ethylene oxide to give a block copolymer. Since the primary hydroxyl groups resulting from ethylene oxide are more reactive than secondary hydroxyl groups, the polyols produced in this manner are more reactive. In this fashion "EO capped" polyether polyols are produced. Random copolymers are obtained by polymerizing mixtures of propylene oxide and ethylene oxide.

However, in RIM polyurethane systems, the amount of ethylene oxide is generally limited to less than about 30 wt. %, either as "EO capping" or as part of the random copolymer. High amounts of ethylene oxide was thought to produce a polyol component with inferior mechanical properties and hygroscopicity in the resulting polyurethane.

In addition, there exists a need to improve existing fiberglass spray molding processes. Typically, these systems are based on polyester resin which are spray molded to form automotive body panels. However the polyester resin systems have an environmental drawback in the release of large amounts of volatile organic compounds, particularly styrene. The Clean Air Act of 1990 (Title 42, section 7412(b)) has identified styrene as a hazardous air pollutant. Accordingly, it is anticipated that new government standards will be issued to limit the release of styrene into the environment, thereby greatly increasing the cost associated with traditional fiberglass spray molding processes. A spray molding process with low volatile organic compound emissions is therefore desired.

Consequently, research continues into systems with excellent mechanical properties, but more flexible gel times and the elimination of "cold break" and which are simple to make.

SUMMARY OF THE INVENTION

Accordingly, one object of this invention is to provide a process for the production of polyurea based articles comprising reaction injection molding:

A) an isocyanate quasi pre-polymer component comprising the reaction product of:
  i) a polyisocyanate having a free isocyanate content of from 20-33% by weight NCO; and
  ii) a polyether triol component having from 50-85% by weight ethylene oxide units and 15-50% by weight propylene oxide units;

wherein said isocyanate quasi pre-polymer has a final NCO content of from 10-27% by weight; and B) a polyol component comprising:
  i) an amine terminated polyether polyol with functionality of 2 or 3 and having a number average molecular weight of 2,000–5,000;
  ii) an aromatic diamine; and
  iii) a hydroxy terminated and amine started polyether polyol of 200–980 number average molecular weight; wherein said amine terminated polyether polyol (i) and said aromatic diamine (ii) are present in a ratio (i)/(ii) of at least 2:1 and said aromatic diamine
  (ii) and said hydroxy terminated and amine started polyether polyol (iii) are present in a ratio (ii)/(iii)i of $\geq 2.5:1$.

The inventor of the present invention has discovered that by using an isocyanate quasi pre-polymer prepared from a polyether polyol with an ethylene oxide content of from 50–85% by weight, a thermosetting polyurea based polymer can be obtained with improved processability in terms of "gel time" (longer gel times) and "demolding time" (shorter demolding times). Furthermore, the resulting polyurea based polymer can have a flexural modulus of $\geq 80,000$ psi at 75° F., preferably >90,000 psi at 75° F. and even more preferably >100,000 psi at 75° F., without exhibiting cold break. These flexural moduluses can be obtained without the addition of fillers or structural reinforcing agents.

DETAILED DESCRIPTION OF THE PREFERRED EMBODIMENTS

The isocyanate quasi pre-polymer is the reaction product of a polyisocyanate with a polyether triol component, having a final free NCO content of 10–27% by weight, more particularly 14–22% by weight. The isocyanate quasi pre-polymer preferably has an isocyanate equivalent weight of 420–168 and a viscosity of 1,000–150 centipoise at 75° F.

The polyether triol component is a polyether triol based on a triol starter such as glycerine. The polyether triol has an ethylene oxide (EO) content of from 50–85 wt. % and a propylene oxide (PO) content of from 15–50 wt. %. More preferably, the EO content is 65–85 wt. % and the PO content is 15–35 wt. %, most preferably a triol having 70 wt. % EO and 30 wt. % PO is suggested.

The polyether triol has a number average molecular weight $M_n$ of 250–6,000, preferably 500–5,000, more preferably 4,000–5,000 and most preferably 4,800. However the polyether triol component should be a liquid at the processing temperatures for RIM of about 80°–100° F., preferably 90° F.

The polyether triol component can be either a random heteropolymer of polyethylene oxide and polypropylene oxide units or end capped with ethylene oxide.

Preferably the polyether triol is a random PO/EO copolymer with a number average molecular weight of 400–6,000.

Also preferred is a polyether triol with a random PO/EO distribution and EO capped with a number average molecular weight of 2,000–6,000.

The polyether triol component has a hydroxyl number of from 28–38, more preferably 35. A suitable material is sold commercially as POLY-G 83-34 (a trademark of Olin Chemicals).

The polyether triol component may be made by conventional methods known to those of ordinary skill in the art. More specifically, polyether triols can be made by the reaction of ethylene oxide and/or propylene oxide with a triol, with the aid of a catalyst such as potassium or sodium hydroxide. A suitable method is described in *Kirk-Othmer Encyclopedia Of Chemical Technology*, 3rd. Ed., vol 18, p638+.

The isocyanate component is methylene bis(4phenylisocyanate) (hereinafter MDI) or a uretonimine modified MDI. The free isocyanate content of the polyisocyanate component is 20–33% by weight of free NCO, more preferably 27–29%. The polyisocyanate component is preferably a liquid at room temperature such as the uretonimine modified MDI. The uretonimine modified MDI has a viscosity of 40 cps at 20° C. Uretonimine modified MDI is preferred.

Examples of commercial materials of this type are Dow-Upjohn's ISONATE 125M (pure MDI) and ISONATE 143L (uretonimine modified MDI), RUBINATE LF-168 (a uretonimine modified MDI and trademark of ICI), and TEDIMON-316 (a uretonimine modified MDI manufactured by EniChem).

The isocyanate quasi pre-polymer is prepared by reacting 1 part of the polyether triol component with from 1–6 part of the isocyanate component at a temperature of from room temperature (72° F.) to 300° F., more preferably 120°–150° F., for a period of 2–3 hours. The isocyanate and polyether triol component may be reacted at room temperature, but preferably they are heated to a temperature of 150° F. As Component A, it is preferred to use an isocyanate quasi pre-polymer component comprising the reaction product of:
  i) uretonimine modified MDI having a free isocyanate content of from 20–30% by weight; and
  ii) a polyether triol component obtained from the reaction of a triol starter with a mixture of ethylene oxide and propylene oxide, containing 50–85% by weight of ethylene oxide and having a number average molecular weight of from 400–6,000; and wherein said isocyanate quasi pre-polymer has a free isocyanate content of from 10–27% by weight.

The Component B used to form the polyurea based comprises:
  i) an amine terminated polyether polyols with functionality of 2 or 3 and having a number average molecular weight of 2,000–5,000;
  ii) an aromatic diamine; and
  iii) a hydroxy terminated and amine started polyether polyol of 200–980 number average molecular weight.

The amine terminated polyether polyol component useful in this invention includes primary and secondary diamine terminated polyether polyols of number average molecular weight 2,000–5,000, preferably 2,000–4,000, most preferably 2,000. Mixtures of diamines may be used.

A suitable amine terminated polyether polyol is commercially available as JEFFAMINE™ D-2000 (a trademark of Texaco Inc.).

As the aromatic diamine component, are diethyltoluene diamine or DETDA which is commercially available as a product of the Ethyl Corporation (ETHACURE® 100) and comprises a mixture of positional isomers having about 76% 1-methyl-3,5-diethyl-2,4-diaminobenzene and about 24% 1-methyl-3,5-diethyl-2,6-diaminobenzene. Also suitable as the aromatic diamine component is dimethylthiotoluenediamines such as 1-methyl,-3,5-dimethylthio -2,4-diaminobenzene and 1-methyl-3,5-dimethylthio -2,6-diaminobenzene available from the Ethyl Corporation as (ETHACURE®300).

The aromatic diamine component may be made by conventional means known to those of ordinary skill in the art. The synthesis of 1-methyl,-3,5-dimethylthio-2,4-diaminobenzene is described in U.S. Pat. No. 4,595,742.

As the hydroxy terminated and amine started polyether polyol component, are $C_2$-$C_3$ alkyleneoxide adducts of triethanolamine, diethanolamine, ethylenediamine, toluendiamine, etc. An adduct which is end capped with ethylene oxide or propylene oxide of molecular weight ranging from 200–980, preferably 200–500, is suggested. Also suitable are aromatic diamines such as toluenediamine which are either ethoxylated or propoxylated or both, as well as ethylene diamine polyols such as ethylene diamine ethoxylated or propoxylated or both polyols. The hydroxy terminated and amine started polyether polyol may also be used as a mixture of the above-identified materials. An aminic polyol with 10–20% by weight of ethylene oxide units and 80–90% by weight of propylene oxide units is preferred. Especially suitable is a mixture of toluenediamine of OH #340 and ethylene diamine propoxylated polyol.

The hydroxy terminated and amine started polyether polyol component may be made by conventional means known to those of ordinary skill in the art in a manner analogous to the synthesis of hydroxy based polyether polyols.

The amine terminated polyether polyol, aromatic diamine and hydroxy terminated and amine started polyether polyol components form the B component of the polyurea based system. The system contains from (i) 58–80% by weight of the amine terminated polyether polyol based on the total weight of the B component, more preferably 58–74% by weight; (ii) 18–33% by weight of the aromatic diamine component based on the total weight of the B component, provided that the ratio of amine terminated polyether polyol to aromatic diamine component is ≧2:1. The hydroxy terminated and amine started polyether polyol component is present in an amount of (iii) 0–12% by weight based on the total weight of the B Component provided that the ratio of aromatic diamine to hydroxy terminated and amine started polyether polyol is ≧2.5:1.

The total sum of components (i), (ii) and (iii) will be 100.

The reactants which form the B component are mixed with the isocyanate quasi pre-polymer at a 102 index or greater. A 102 index is known to those of ordinary skill in the art as meaning that at least 1.02 equivalents of isocyanate groups in the isocyanate quasi pre-polymer are reacted per equivalent of active hydrogen containing component based on the B components. Preferably the index is in the range of 102–110, more preferably 105.

The polyurea based compositions disclosed in the process of the present invention can be formed by conventional reaction injection molding techniques or can be formed by spraying into fiberglass patterns. This includes both open and closed mold processes. This allows for a substitute spray molding composition which gives physical properties as good or better than conventional polyester resin fiberglass article, yet avoids the problem of volatile organic compounds. In addition, the composition can be applied using existing spray molding equipment.

The present invention also allows for the formation of a Structural Reaction Injection Molding (SRIM) molded article with an A class surface. This is achieved by RIM molding or spraying a surface layer of the polyurea based composition of the present invention on either or both surfaces of a mold to form the exterior surfaces, followed by forming an intermediate layer by conventional SRIM methods. The polyurea based surface layer may be filled or unfilled with conventional fillers and additives. Conventional SRIM articles often suffer the draw back of a surface layer which reveals the fiberglass structural reinforcement. By forming a surface layer of polyurea based polymer, an A class surface can now be obtained in an SRIM article. The surface layer of polyurea based polymer may be from 0.1–0.2"thick, preferably 0.125". It is preferable for the intermediate layer be of the same polymer composition as the surface layers to avoid delamination problems due to differences in the coefficient of thermal expansion.

The polyurea based composition is formed in the absence of a urethane forming catalyst.

The molded articles according to the present invention may contain suitable fillers and reinforcing material and the like, stabilizer, mold release agents and other additives known to those of ordinary skill in the art as commonly employed in the field of polyurethane molding compositions, especially RIM molding compositions.

As reinforcing materials are included but not limited to chopped or milled glass fibers, chopped or milled carbon fibers, or mineral fibers such as calcium silicate or wollastonite fibers or mica. Particularly suitable are fiberglass reinforcement fibers, particularly those having lengths of from about 1/16" to about 1/2".

The polyurea based composition of the present invention has been found to have improved processability in terms of "gel times" and demold times, improved thermal resistance (HDT and SAG tests), improved impact resistance at a high flexural modulus of elasticity without sacrificing cold break properties and improved aging stability of the B Component being absent any catalysts. Gel times on the order of 1.2–3 seconds and demolding times lower than 30 seconds or as short as 20–25 seconds are possible.

Other features of the invention will become more apparent the course of the following description of exemplary embodiments which are given for illustration of the invention and are not intended to be limiting thereof.

The physical properties of the polymers formed in the following examples were tested according to ASTM standards. Specifically Tensile Strength and % elongation were determined according to ASTM D638. Flexural Modulus was measured according to ASTM 790. Gardner Impact was measured according to ASTM D3029.

SYNTHESIS OF ISOCYANATE OUASI PRE-POLYMER

EXAMPLE 1

A uretonimine modified MDI (TEDIMON-316 from EniChem, a 29% of free NCO) was reacted with a 4,800 molecular weight polyether triol (glycerine starter) containing, with random distribution, 70% b.w. EO, 30% b.w. PO (polyol TERCAPUR 1264 from EniChem) at 150° F. The material was dispensed into containers and checked for percent NCO, viscosity and reactivity. Isocyanate quasi pre-polymers were made by this process with the following NCO percent:

| % NCO | T-316/1264 |
|---|---|
| 14 | 1/1 |
| 17 | 1.5/1 |
| 19 | 2/1 |
| 21 | 3/1 |
| 23 | 4/1 |
| 24 | 5/1 |
| 25 | 6/1 |

EXAMPLE 2 (Comparative)

In this, and all further examples, parts by weight (pbw) are determined based on 25 pbw of the aromatic diamine component.

TABLE 1

| Composition | AA pbw | BB pbw | CC pbw |
|---|---|---|---|
| Diethyltoluene diamine[1] | 25 | 25 | 25 |
| 2,000 Mw Diamine[2] | 50 | — | — |
| 3,000 Mw triamine[3] | — | 50 | — |
| 5,000 Mw triamine[4] | — | — | 50 |
| Zinc Stearate (dispersion) | 3 | 3 | 3 |

[1](ETHACURE 100) a trademark of the Ethyl Corporation
[2](JEFFAMINE D2000) a trademark of the Texaco Corporation
[3](JEFFAMINE T3000) a trademark of the Texaco Corporation
[4](JEFFAMINE T5000) a trademark of the Texaco Corporation Polyurea based compositions of AA, BB and CC were prepared by reaction with an isocyanate quasi pre-polymer prepared from uretonimine modified MDI and a 4,800 molecular weight EO capped polyether triol (polyol Tercapur-844 from New Carbochim-EniChem EO content lower than 30%). Polyurea based compositions were prepared from isocyanate quasi pre-polymer having a free-isocyanate content of 14% and 17% by weight. The polyurea based compositions were prepared under the following conditions:

Mold: 600 ×300 mm plate 3.1 mm thickness (weight 650–750 g)

Mold Temperature: 70° C.

Equipment: Gusmer high pressure machine model Delta Rim 120

Output: 900 g/sec

Raw Material Temperature: 35° C.

The properties of these polymers are listed below in Table 2.

TABLE 2

| | | Propert. | | |
|---|---|---|---|---|
| Comp. | Tensile Strength psi | % Elongation | Flexural Modulus psi | Heat Sag 6". 300° F. (inches) |
| AA-14%[1] | 4,000 | 116 | 64,200 | 0.05 |
| AA-17%[1] | 4,300 | 73 | 78,700 | 0.05 |
| BB-17%[2] | 3,440 | 135 | 72,800 | 0.05 |
| CC-17%[2] | 4,400 | 136 | 76,100 | 0.05 |

[1]No cold break observed; 1.5 second gel time; good release
[2]No cold break observed; 1.2 second gel time; good release The same compositions AA, BB and CC were then reacted with a 17% by weight of NCO isocyanate quasi pre-polymer prepared as described in Example 1. The properties of the resulting polymer are described below.

TABLE 3

| | | Propert. | | |
|---|---|---|---|---|
| Comp. | Tensile Strength psi | % Elongation | Flexural Modulus psi | Heat Sag 6". 300° F. (inches) |
| AA-17% (1) | 4,330 | 73 | 78,700 | 0.05 |
| BB-17% (1) | 3,440 | 135 | 72,800 | 0.05 |
| CC-17% (1) | 4,400 | 136 | 76,100 | 0.05 |

(1) No cold-break observed; 1.2 second gel time

From the data in the above Tables 2 and 3, it is apparent that no difference in the mechanical properties was observed at an NCO content of 17% between the isocyanate quasi pre-polymer of the example i and the isocyanate quasi pre-polymer from Tercapur-844. However, these compositions do not allow for a flexural modulus above 80,000 psi to be obtained.

EXAMPLE 3

The composition AA of Example 2 was reacted either with an isocyanate quasi pre-polymer of 19% by weight NCO prepared from polyol Tercapur-844 and with an isocyanate quasi pre-polymer of 19% by weight NCO prepared from polyol Tercapur 1264 according to Example 1 and according to the procedure of Example 2. The data is reproduced below in Table 4.

TABLE 4

| | | Properties | | |
|---|---|---|---|---|
| Composition | Tensile Strength psi | % Elongation | Flexural Modulus psi | Heat Sag 6". 300° F. (inches) |
| AA-19% T-844 | — | — | — | — |
| AA-19% T-1264[1] | 3,440 | 135 | 80,000 | 0.05 |

[1]No cold break observed; 1.2 second Gel Time;

The polymer compositions prepared from T-844 at a 19% NCO level could not be molded without cold break occurring. Thus, the high EO based polyol isocyanate quasi pre-polymer allows for a flexural modulus above 80,000 psi without cold break being observed. Furthermore, no post-curing was necessary.

EXAMPLE 4

To test the effects of adding a hydroxy terminated and amine started polyether polyol, the composition AA of Example 2 was further mixed with 10 parts of a triethanolamine adduct with an OH No. 650. Polymer compositions were then prepared according to Example 2 with an isocyanate quasi pre-polymers containing 19%, 21% and 24% by weight NCO prepared in Example 1. The data is reproduced below in Table 5.

TABLE 5

| % NCO | Tensile Strength psi | % Elongation | Flexural Modulus psi | Heat Sag 6". 300° F. (inches) | Gardner Impact In lb. | Gel Time sec |
|---|---|---|---|---|---|---|
| 19% | 4,480 | 95 | 80,000 | 0.05 | 320 | 2 |
| 21% | 5,180 | 80 | 106,000 | 0.05 | 300 | 1.7 |
| 24% | 6,400 | 50 | 173,000 | 0.05 | — | 1.5 |

In each of the above cases, no cold break was observed and a longer gel time was achieved in the area of 1.5 and 2 seconds. No post-curing was necessary.

EXAMPLE 5

The composition of Example 4 was used, except replacing the triethanolamine adduct with OH No. 650, with a toluenediamine polyol having OH No. 390. This was reacted with isocyanate quasi pre-polymers prepared according to Example i with an NCO content of 14%, 17%, 19%, 21%, 24% and 25% by weight and according to the procedure of Example 2. RIM and R/RIM products were produced. The data is reproduced below.

TABLE 6

| TENSILE | 14% NCO | 17% NCO | 19% NCO | 21% NCO | 24% NCO | 25% NCO |
|---|---|---|---|---|---|---|
| with No Glass | 4100 | 4700 | 5100 | 5450 | 5850 | 6100 |
| with 15% Glass | 4000 | 4600 | 5000 | 5350 | 5750 | 5900 |
| PSI | | | | | | |
| FLEX MOD. | | | | | | |
| with No Glass | 50 | 90 | 130 | 150 | 180 | 200 |
| with 15% Glass | 120 | 170 | 225 | 250 | 290 | 310 |
| PSI × 1000 | | | | | | |
| GARDNER IMPACT | | | | | | |
| with No Glass | 320 | 320 | 320 | 310 | 250 | 170 |
| with 15% Glass | 280 | 250 | 200 | 170 | 135 | 125 |
| in-lbs. | | | | | | |
| % ELONGATION | | | | | | |
| with No Glass | 250 | 150 | 120 | 110 | 105 | 102 |
| with 15% Glass | 100 | 80 | 65 | 35 | 15 | 10 |
| HEAT SAG | | | | | | |
| with No Glass | 0.07 | 0.06 | 0.055 | 0.05 | 0.045 | 0.04 |
| with 15% Glass | 0.04 | 0.0375 | 0.035 | 0.03 | 0.028 | 0.025 |
| in @ 121° C. | | | | | | |

Glass = 1/16" milled fiber

Gel Times are comprised between 1.5 and 2 seconds and demolding times are shorter than 30 sec. No post-curing was necessary.

EXAMPLE 6

The composition of Example 4 was used, except replacing the triethanolamine adduct with OH No. 650, with 7.5 pbw of an ethylene diamine propoxylated polyol. This was reacted with a 19% by weight NCO isocyanate quasi pre-polymer according to Example 1 and the procedure of Example 2. The physical properties were the same as was observed from the 19% NCO quasi pre-polymer of Example 5 and Gel Time was 1.2 sec. No post-curing was necessary.

EXAMPLE 7

The composition of Example 4 was used, except replacing the triethanolamine adduct with OH No. 650, with a mixture of 5 pbw of an ethylene diamine propoxylated polyol and 5 pbw of toluenediamine polyol having OH No. 390. This was reacted with a 19% by weight NCO isocyanate quasi pre-polymers according to Example 1 and the procedure of Example 2. The physical properties were the same as was observed from the 19% NCO isocyanate quasi pre-polymer of Example 5. No post-curing was necessary.

EXAMPLE 8

The composition of Example 6 was used, however the material was sprayed onto fiberglass molds. A GUSMER spray machine model VR 3000 was used at the following temperatures:

Hose of component A =170° F.

Hose of component B =179° F.

Primary =A =174° F.

Primary =B =174° F.

Mixing pressures were 1200 psi for A and B. The gun was a modified GX-7. The composition of Example 6 was sprayed on a 100° F. mold to form a layer 0.125"thick. Demold was 30 seconds after spraying. No delamination between the layers was noted.

EXAMPLE 9

The same procedure of Example 8 was repeated using a pattern coated with a water based acrylic and acrylic urethane (available from Akzo) paint. A layer of 0.125"thickness was formed and removed 30 seconds after spraying. The results showed no delamination between the layers and excellent adhesion to the painting film. Example 10

For comparison, the composition formed from a polyurea system based on DETDA, JEFFAMINE T-5000, a 5,000 $M_n$ polypropylene oxide triamine from Texaco, and uretonimine Tedimon-316 from EniChem was spray molded and it was observed to cured very fast upon spraying. The material was sprayed onto fiberglass patterns. A GUSMER spray machine model VR 3000 was used at the following temperatures:

Hose of component A =170° F.

Hose of component B =179° F.

Primary =A =174° F.

Primary =B =174° F. Mixing pressures were 1200 psi for A and B. The gun was a modified GX-7. The composition identified above was sprayed on a 100° F. mold to form a layer 0.125"thick. Demold was 30 seconds after spraying. Delamination between the layers was noted. Brittleness occurred when the flexural modulus was over 80,000 psi.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. The method of reaction injection molding (RIM) to produce a molded article having a flexural modulus ≧80,000 p.s.i. comprising:

admixing a component A) and a component B) in a mold;

reacting said component A) and said component B) in said mold, wherein component A) comprises an isocyanate quasi pre-polymer component comprising the reaction product of:
  i) a polyisocyanate said polyisocyanate being MDI or modified MDI having a free isocyanate content of from 20–33% by weight NCO; and
  ii) a polyether triol component having from 50–85% by weight ethylene oxide units and 15–50% by weight propylene oxide units;

wherein said isocyanate quasi pre-polymer has a final NCO content of from 10–27%; and component B) comprising:
  i) an amine terminated polyether polyol with functionality of 2 or 3 and having a number average molecular weight of 2,000–5,000;
  ii) an aromatic diamine; and
  iii) a hydroxy terminated and amine started polyether polyol of 200–980 number average molecular weight; wherein said amine terminated polyether polyol (i) and said aromatic diamine (ii) are present in a ratio (i)/(ii) of at least 2:1 and said aromatic diamine (ii) and said hydroxy terminated and amine started polyether polyol (iii) are present in a ratio (ii)/(iii) of ≧2.5:1;

gelling said components in said mold wherein gel times are 1.2 to 3 seconds; and demolding said molded article, wherein the demolding time is 50 seconds or less.

2. The process of claim 1, wherein said polyether triol component is a random PO/EO copolymer with a number average molecular weight of 400–6,000.

3. The process of claim 1, wherein said polyether triol component has a random PO/EO distribution and is EO capped with a number average molecular weight of 2,000–6,000.

4. The process of claim 1, wherein said polyol component comprises:
  i) 58–80% by weight of an amine terminated polyether polyol with functionality of 2 or 3 and having a number average molecular weight of 2,000–5,000;
  ii) 18–33% by weight of an aromatic diamine; and
  iii) 0–12% by weight of a hydroxy terminated and amine started polyether polyol of 200–980 number average molecular weight;

provided that the total sum of components (i), (ii) and (iii) will be 100.

5. The process of claim 4, comprising 58–74% by weight of an amine terminated polyether polyol component.

6. The process of claim 1, wherein said amine terminated polyether polyol has a number average molecular weight of from 2,000–4,000.

7. The process of claim 1, wherein said process is reinforced reaction injection molding.

8. The process of claim 1, wherein said process is structural reaction injection molding.

9. A composition for a RIM process suited for the production of molded articles having a flexural modulus ≧80,000 p.s.i. comprising component A) an isocyanate quasi pre-polymer component comprising the reaction production of:
  i) a polyisocyanate, said polyisocyanate being a MDI or modified MDI having a free isocyanate content of from 20–33% by weight NCO; and
  ii) a polyether triol component having from 50–85% by weight ethylene oxide units and 15–50% by weight propylene oxide units;

wherein said isocyanate quasi pre-polymer has a final NCO content of from 10–27%; and component B) a polyol component comprising:
  i) an amine terminated polyether polyol with functionality of 2 or 3 and having a number average molecular weight of 2,000–5,000;
  ii) a hydroxy terminated and amine started polyether polyol of 200–980 number average molecular weight; wherein said amine terminated polyether polyol (i) and said aromatic diamine (ii) are present in a ratio (i)/(ii) of at least 2:1 and said aromatic diamine (ii) and said hydroxy terminated and amine started polyether polyol (iii) are present in a ratio (ii)/(iii) of ≧2.1:1.

10. A method for forming a reinforced molded article with an A class surface comprising;

1) forming a first layer of a polymer molding composition comprising admixing a component A) and a component B) in a mold, reacting said component A) and said component B) in said mold wherein component A) is an isocyanate quasi pre-polymer component comprising the reaction product of:
  i) a polyisocyanate, said polyisocyanate being MDI or modified MDI having a free isocyanate content of from 20–33% by weight NCO;
  ii) a polyether triol component having from 50–85% by weight ethylene oxide units and 15–50% by weight propylene oxide units;

wherein said isocyanate quasi pre-polymer has a final NCO content of from 10–27%; and component B)is a polyol component comprising:
  i) an amine terminated polyether polyol with functionality of 2 or 3 and having a number average molecular weight of 2,000–5,000;
  ii) an aromatic diamine; and
  iii) a hydroxy terminated and amine started polyether polyol of 200–800 number average molecular weight;

wherein said amine terminated polyether polyol (i) and said aromatic diamine (ii) are present in a ratio (i)/(ii) of at least 2:1 and said aromatic diamine (ii) and said hydroxy terminated and amine started polyether polyol (iii) are present in a ratio (ii)/(iii) of ≧2.5:1 on at least one surface of a mold;

ii) forming a second Layer on said first layer of a polymer molding composition by structural reaction injection molding.

11. A molded article comprising the reaction product of a polymer molding composition comprising admixing a component A) and a component B) in a mold, reacting said component A) and said component B) in said mold wherein component A) is an isocyanate quasi pre-polymer component comprising the reaction product of:
  i) a polyisocyanate, said polyisocyanate being MDI or a modified MDI having a free isocyanate content of from 20–33% by weight NCO;

ii) a polyether triol component having from 50–85% by weight ethylene oxide units and 15–50% by weight propylene oxide units;

wherein said isocyanate quasi pre-polymer has a final NCO content of from 10–27%; and component B) is a polyol component comprising:

i) an amine terminated polyether polyol with functionality of 2 or 3 and having a number average molecular weight of 2,000–5,000;

ii) an aromatic diamine; and iii) a hydroxy terminated and amine started polyether polyol of 200–800 number average molecular weight;

wherein said amine terminated polyether polyol (i) and said aromatic diamine (ii) are present in a ratio (i)/(ii) of at least 2:1 and said aromatic diamine (ii) and said hydroxy terminated and amine started polyether polyol (iii) are present in a ratio (ii)/(iii) of >2.5:1.

12. A molded article according to claim 11, wherein the molded article has a flexural modulus of ≧80,000 psi at 75° F. and being substantially free of "cold break properties".

13. The reaction injection molding process of claim 1, wherein said polyether triol component has 70–85% by weight ethylene oxide units and 15–30% by weight propylene oxide units.

14. The reaction injection molding process of claim 1, wherein said isocyanate quasi pre-polymer has a final NCO content of from 19–27%.

15. The reaction injection molding process of claim 1, wherein said polyether triol component is a random heteropolymer of polyethylene oxide and polypropylene oxide units.

* * * * *